United States Patent [19]

Mauer

[11] 4,197,688
[45] Apr. 15, 1980

[54] TRIM STRIPS

[75] Inventor: Dieter Mauer, Giessen, Fed. Rep. of Germany

[73] Assignee: USM Corporation, Farmington, Conn.

[21] Appl. No.: 968,993

[22] Filed: Dec. 13, 1978

[30] Foreign Application Priority Data

Dec. 16, 1977 [DE] Fed. Rep. of Germany ....... 2756248

[51] Int. Cl.² ............................................. E04F 15/14
[52] U.S. Cl. .................................. 52/718; 24/73 HS; 52/766; 52/400
[58] Field of Search ................. 52/766, 767, 400, 717, 52/718; 24/73, 73 HS

[56] References Cited

U.S. PATENT DOCUMENTS

| | | | |
|---|---|---|---|
| 2,614,298 | 10/1952 | Ketchum | 52/767 |
| 3,239,988 | 3/1966 | Meyer | 52/718 |
| 3,413,770 | 12/1968 | Adams | 52/717 |
| 3,445,979 | 5/1969 | Meyer | 52/718 |
| 3,670,368 | 6/1972 | Meyer | 24/73 |
| 3,740,800 | 6/1973 | Meyer | 52/718 |
| 3,775,927 | 12/1973 | Meyer | 52/718 |
| 3,807,964 | 4/1974 | Meyer | 52/718 |
| 3,968,613 | 7/1976 | Meyer | 52/400 |

FOREIGN PATENT DOCUMENTS

| | | | |
|---|---|---|---|
| 2049261 | 6/1969 | France | 52/400 |
| 1272750 | 5/1972 | United Kingdom | 52/717 |
| 1277071 | 6/1972 | United Kingdom | |
| 1292103 | 10/1972 | United Kingdom | |
| 1292184 | 10/1972 | United Kingdom | 24/73 |
| 1319113 | 6/1973 | United Kingdom | |

*Primary Examiner*—James A. Leppink
*Assistant Examiner*—Henry E. Raduazo
*Attorney, Agent, or Firm*—Aubrey C. Brine; Richard B. Megley; Vincent A. White

[57] ABSTRACT

A windshield or backlight glazing trim clip suitable for automobiles is provided having a resilient portion between the base and an upwardly projecting rib. The base engages a stud on the automobile body and elongated fingers on the rib save to secure a trim strip.

11 Claims, 8 Drawing Figures

TRIM STRIPS

BACKGROUND OF THE INVENTION

This invention is concerned with trim clips for use in securing channel-shaped trim strips around windscreens in the manufacture of motor vehicles. Such trim strips customarily have inturned rims running along each side which can be engaged by shoulder portions of trim clips to hold the strips in place.

A variety of trim clips of metal or plastics is available for securing trim strips to various parts of a car body, the precise configuration of a clip having been developed with regard to its intended manner of attachment of the car body, the shape and size of the trim strip, and the disposition of the strip in relation to adjacent parts of the car, for example. The development of clips for use in securing trim strips around windscreens may also have to take into account the manner of securing the windscreen to the car body, and the dimensional variations tolerated in the manufacture of the car; the configuration of the clip, and the material of which it is made, should also be compatible with economical production and installation of the clip itself.

Bearing in mind the foregoing factors, it is the object of the invention to provide an improved plastics trim clip for use in securing trim strips around windscreens in the manufacture of motor vehicles, where the body of the vehicle around the opening to the windscreen has been provided with a row of headed studs, for example welded onto the body, onto one of which the clip is to be assembled for reception of a trim strip.

SUMMARY OF THE INVENTION

The invention provides a plastics trim clip comprising a base having a slot in it for the reception of a headed stud, a rib running along one side lengthwise of the base and projecting upwardly from an upper surface of the base, two elongated resilient fingers projecting upwardly from the rib and curving outwardly in opposite directions generally lengthwise of the rib, and at least one shoulder disposed to be engaged by and to retain one inturned rim of a channelled-shaped trim strip when the other inturned rim is engaged by said fingers, the slot in the base being elongated and extending in a direction inclined to that of the rib so that, in assembling the clip on a headed stud, advance of the clip relative to the stud brings the said rib progressively closer to the stud.

Preferably, the rib of a clip as set out in the last preceding paragraph projects upwardly from the base at substantially 90° and the rib and said fingers lie substantially in a common plane. Thus, where the aperture of a windscreen in a car body is surrounded by a panel which has a flange substantially at right angles to the windscreen, T-studs can be welded to the flange, and clips in accordance with the invention assembled on the studs, the further the clips are advanced onto the studs, the nearer the ribs, and therefore the fingers, will be drawn towards the windscreen and the closer the trim strip will be held towards the aperture. The angular disposition of the rib and base can, of course, be varied to suit the angular disposition of the flange of the surrounding panel of the intended application for the clip.

The material of which a clip in accordance with the invention is made, and the cross-section of the clip where the rib joins the base, will determine the resistance to pivotal movement of the rib relative to the base. The rib and base may accordingly be made rigid, or they may be made pivotal relative to one another against the resistance afforded by the resilience of the material at the junction of the rib and base, which then constitutes a hinge. Such pivotal movement facilitates accommodating wide dimensional variations in the disposition of the windscreen and panel which may be tolerated in car production.

The outward curving of the elongated fingers of a clip in accordance with the invention ensures retention of the inner inturned ribs of a trim strip around a windscreen and, by affording a large enough bearing against the strip, avoids indentation of the strip such as might mar its appearance.

Preferably, a clip in accordance with the invention has flaps arranged to lie between the trim strip and the windscreen and between the trim strip and body panel surrounding it when the strip has been assembled to avoid squeaking or abrasion due to vibration when the vehicle is in use; abrasion of points on the panel might lead to rusting of the panel. Conveniently, the flap which is to lie between the trim strip and the windscreen projects from the upper edge of the rib between the resilient fingers.

The slot of a clip in accordance with the invention is preferably L-shaped (as viewed from above if it is wholly visible), opening at a front side of the base, opposite the rib, permit entry of a stud in a manner which facilitates assembly of the clip on a stud.

Three trim clips in accordance with the invention will now be described in detail with reference to the accompanying drawings, the clips having been selected for description to illustrate the invention in its various aspects by way of example and not of limitation of the invention.

DESCRIPTION OF THE PREFERRED EMBODIMENTS

Figure 1:
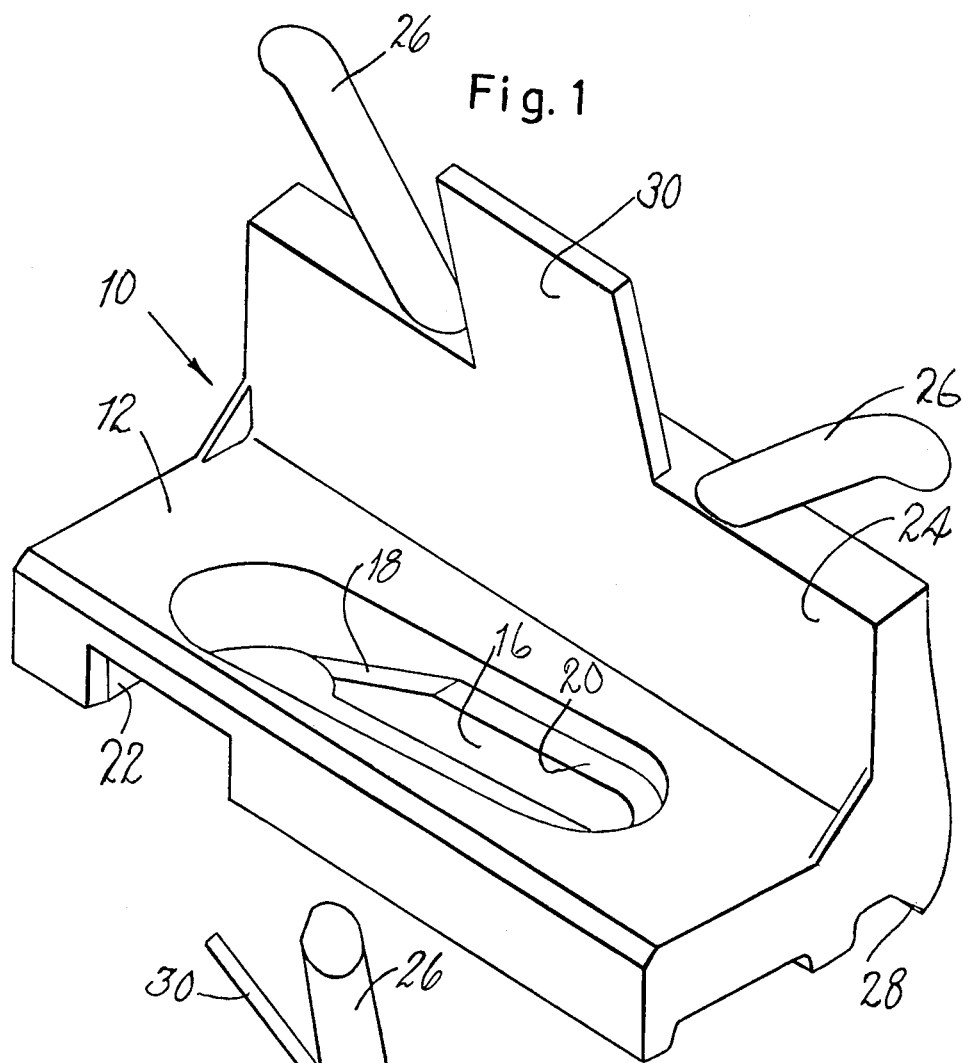
FIGS. 1, 2 and 3 show the first illustrative clip in perspective, section and rear views respectively.
Figure 2:
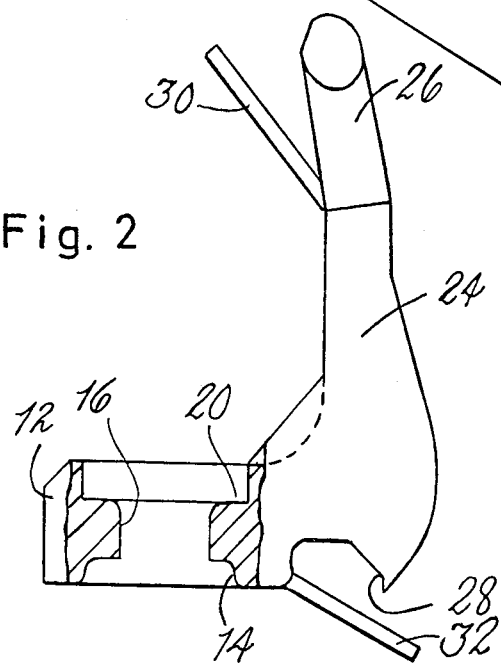
Figure 3:
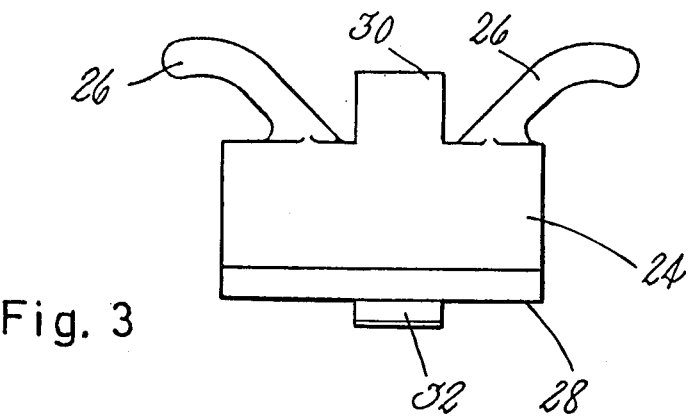

The illustrative trim clips are intended for use in securing trim strips around the windscreens of motor cars, and each is a one-piece plastics molding. The first illustrative clip, 10, is shown in FIGS. 1, 2 and 3 and comprises a base 12 relieved at its underside as a central channel 14 extending the whole length of the body, thus providing a central web in which a slot 16 is formed. The slot 16 is stepped to provide ramps 18 and a flat retaining ledge 20 so that the clip can be assembled on a T-stud welded to a panel, the stud being accommodated in the slot with its head bearing on the ledge 20; assembly of the clip on the stud is facilitated by the ramps 18, the web yielding sufficiently so that the clip is held firmly in place. The slot 16 is L-shaped as viewed from underneath and opens at 22 in a front edge of the base to facilitate assembly of the clip on a stud. The slot 16 lies generally oblique to a straight rear edge of the base, as viewed in plan, so that the rear edge approaches the stud the further the clip is pushed onto it.

Along the rear edge of the clip 10 is an upstanding rib 24 projecting substantially at 90° to the upper surface of the base. From a top edge of the rib 24, two elongated resilient fingers 26 project upwardly and curve outwardly in opposite directions substantially in the plane of the rib 24. A retaining shoulder 28 runs along a lower rear edge of the rib 24. The shoulder 24 and fingers 26 are arranged to engage the inturned rims along the sides of a trim strip and hold the strip firmly. The outer curved end portion of each of the fingers 26 is shaped to afford a large enough area of engagement with the strip to avoid distortion of the visible surface of the strip.

The clip 10 is also provided with flaps 30,32 which, when a trim strip is assembled on it, lie between the strip and the windscreen and between the strip and the surrounding body panel respectively when the strip is assembled on the car body, thus to avoid squeaking or abrasion and allow ventilation for the evaporation of moisture. The flap 30 projects upwardly from the top edge of the rib 24 between the fingers 26.

The first illustrative clip 10 is sufficiently rigid where the rib 24 joins the body 12 for it to resist pivoting of the rib relative to the body. The clip can thus bear with progressively increasing pressure against the windscreen, if desired, by urging the clip further along the stud until, if necessary, the end of the slot nearest the rib 24 is under the stud head.

Figure 4:
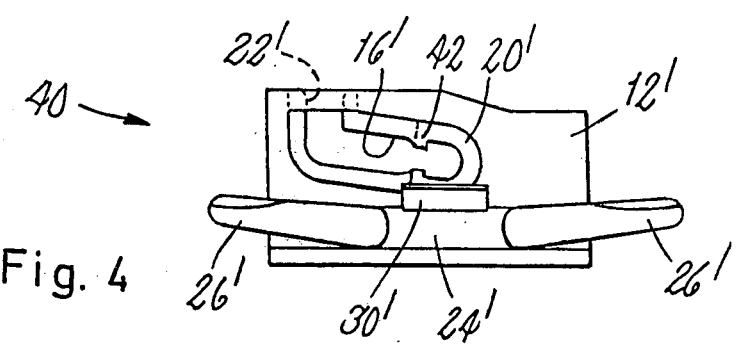
FIGS. 4 and 5 show the second illustrative clip in plan and, partly in section, in an assemblage respectively.
Figure 5:
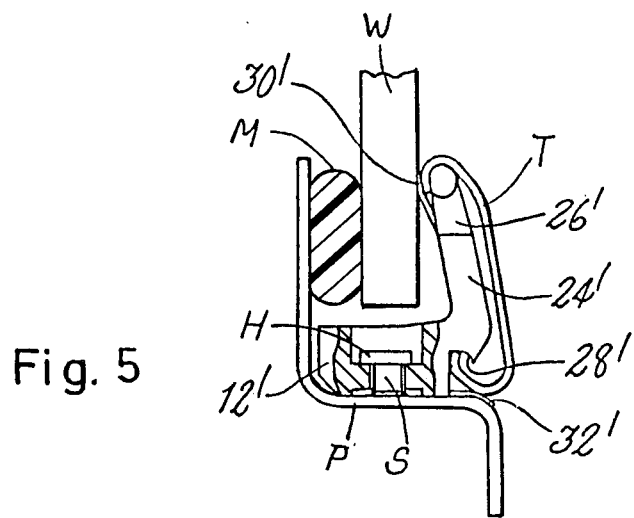

The second illustrative clip 40 is similar to the clip 10 in many respects, and the same reference numerals, suffixed by a dash, are used for corresponding parts of the clip, as depicted in FIGS. 4 and 5. In the clip 40, the slot 16' (which happens to be the other way round from that of the clip 10, which merely means that the clips are pushed in opposite directions when assembling them on the studs) has a neck 42 through which the stud shank can be pushed against the resilience of the clip material and thereby retained against accidental displacement. Also, the clip 40 differs from the clip 10 in that the rib 24' is pivotal relative to the body 12' against the resilience of the material which provides a hinge 44 (FIG. 5) where the rib and base meet. The clip 40 is thus more suitable than the clip 10 for assemblages where variations in the disposition of the windscreen and panel due to manufacturing tolerances have to be accommodated.

Figure 6:
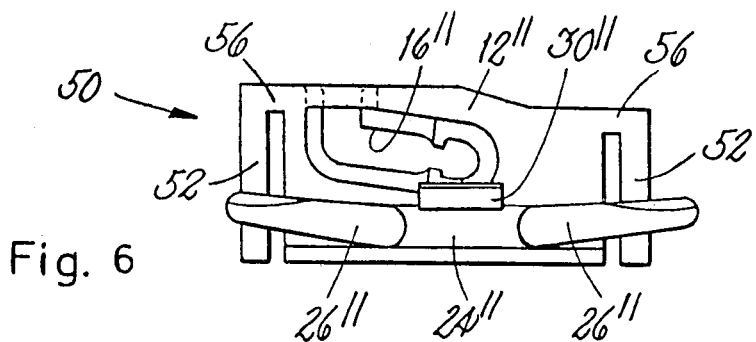
FIGS. 6, 7 and 8 show the third illustrative clip in plan and rear views, and, partly in section, in an assemblage, respectively.

FIG. 6 shows the clip 40 as it may be used in securing a trim strip T to a T-stud S, which has a head H, welded to a flange of a panel P to which a windscreen W has been bonded by a strip of sealing material M. On assembly, after securing the clip 40 on the stud S with the ledge 20' resiliently seated under the head H, the fingers 26' are received in one inturned rim of the strip S, and the other inturned rim is clipped over the shoulder 28'.

Figure 7:
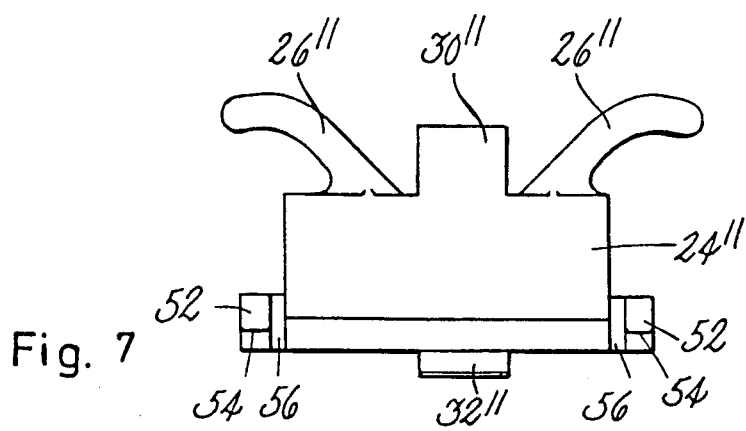
Figure 8:
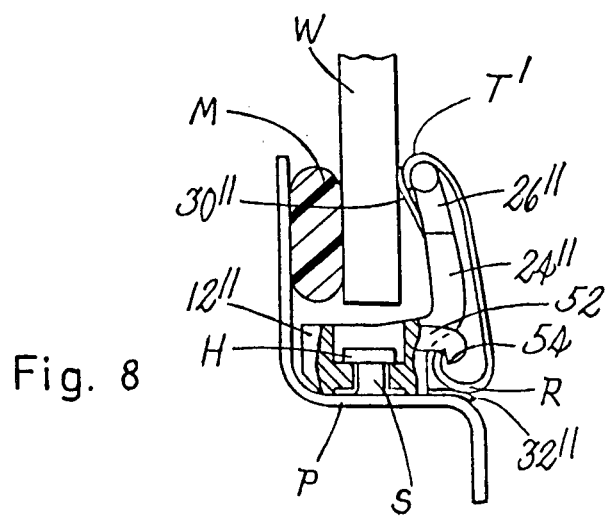

FIGS. 6, 7 and 8 show the third illustrative clip 50 which differs from the clip 40 only in that, instead of the shoulder 28' being provided along the bottom edge of the rib 26', two resilient tongues 52 are provided, one at each end of the base 12'', (reference numerals of parts corresponding to those of the clip 40 are suffixed by two dashes). Each tongue 52 joins the base 12'' near the front edge opposite the rib 26'' and, in line with where the retaining shoulder would have been provided on the rib, has a retaining shoulder 54. FIG. 7 shows the clip in use to secure a trim strip T'. The tongues 52, being flexible due to their length and also able to twist at their junctions 56 with the base, facilitate the assembly of a trim strip, with an especially deep rim R along its outer side.

The relative rigidity or flexibility of the junction between the rib and the base of a clip in accordance with the invention can be achieved by varying the cross-section of the hinge or by choice of material. Stiffer plastics materials, for example acetal or nylon resin filled with mineral, e.g. glass, fibre, may be used where rigidity is desired. Unfilled acetal or nylon resin is preferred where flexibility and resilience are sought. Where rigidity is desired, the joint between the rib and base may be reinforced by strengthening webs 25.

The clips 10, 40 and 50 are economical to manufacture by injection molding of thermoplastic synthetic resinuous material and can be quickly and readily assembled on T-studs welded to a panel flange around a windscreen opening and are such that a trim strip can easily be assembled on them, thus reducing to a minimum the cost of securing the trim strip to the vehicle.

I claim:

1. A plastics trim clip comprising a base having a slot in it for the reception of a headed stud, a rib running along one side lengthwise of the base and projecting upwardly from an upper surface of the base, two elongated resilient fingers projecting upwardly from the rib and curving outwardly in opposite directions generally lengthwise of the rib, and at least one shoulder disposed to be engaged by and to retain one inturned rim of a channelled-shaped trim strip when the other inturned rim is engaged by said fingers, the slot in the base being elongated and extending in a direction inclined to that of the rib so that, in assembling the clip on a headed stud, advance of the clip relative to the stud brings the said rib progressively closer to the stud.

2. A clip according to claim 1 in which the rib projects upwardly from the base at substantially 90°.

3. A clip according to claim 2 in which said fingers and said rib lie substantially in a common plane.

4. A clip according to claim 1, in which the base and rib are rigidly disposed relative to one another.

5. A clip according to claim 1, in which the base and rib join at a resilient flexible apex which permits of relative pivotal movement between them against the resistance of the resilience of the clip material.

6. A clip according to claim 5 in which the slot in the base is shaped to resist withdrawal of the clip from the stud when the stud has been received at the end of the slot closest to said rib.

7. A clip according to claim 1 in which the slot is L-shaped and leads from an opening for reception of a stud along the side of the base opposite said rib.

8. A clip according to claim 1 in which said at least one shoulder is provided on said rib.

9. A clip according to claim 1 in which said at least one shoulder is provided by two resilient tongues disposed adjacent the ends of the body, each tongue being joined to the body adjacent the side opposite said rib and having a retaining shoulder substantially in longitudinal alignment with said rib.

10. A clip according to claim 1 comprising also flexible flaps disposed to lie between the trim strip and the windscreen and between the trim strip and the vehicle body when the clip and trim strip are assembled in the manufacture of a vehicle.

11. A clip according to claim 10 in which the flap disposed to lie between the trim strip and the windscreen projects upwardly from the rib between the resilient fingers.

* * * * *